(12) United States Patent
Zhong

(10) Patent No.: US 12,706,359 B2
(45) Date of Patent: Aug. 11, 2026

(54) DRAIN VALVE FOR BATTERY BOX, BATTERY, ELECTRIC APPARATUS, AND DRAINAGE METHOD

(71) Applicant: CONTEMPORARY AMPEREX TECHNOLOGY CO., LIMITED, Ningde (CN)

(72) Inventor: Siling Zhong, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 24 days.

(21) Appl. No.: 18/795,834

(22) Filed: Aug. 6, 2024

(65) Prior Publication Data

US 2024/0396190 A1 Nov. 28, 2024

Related U.S. Application Data

(63) Continuation of application No. PCT/CN2023/077234, filed on Feb. 20, 2023.

(30) Foreign Application Priority Data

Mar. 8, 2022 (CN) ......................... 202210227264.5

(51) Int. Cl.
*H01M 50/691* (2021.01)
*F16K 31/12* (2006.01)
*F16K 99/00* (2006.01)

(52) U.S. Cl.
CPC ........... *H01M 50/691* (2021.01); *F16K 31/12* (2013.01); *F16K 99/0015* (2013.01);
(Continued)

(58) Field of Classification Search
CPC ........ F16K 31/12; F16K 31/42; F16K 15/148; F16K 99/0005; F16K 99/0015;
(Continued)

(56) References Cited

U.S. PATENT DOCUMENTS 6,328,310 B1 12/2001 Chikaraishi
8,944,087 B2 * 2/2015 Thyroff .................. F16K 31/12 137/67
(Continued)

FOREIGN PATENT DOCUMENTS

CN 1776100 A 5/2006
CN 202834109 U 3/2013
(Continued)

OTHER PUBLICATIONS

Machine English translation of DE-102009026222-A1 (Year: 2025).*
(Continued)

*Primary Examiner* — Hailey K. Do
(74) *Attorney, Agent, or Firm* — ANOVA LAW GROUP, PLLC

(57) ABSTRACT

A drain valve includes a sealing member and an expansion member, where the sealing member is configured to be disposed on an outer side of a drain outlet of a battery box, the expansion member is disposed on a side of the sealing member facing the drain outlet, and the expansion member is configured to expand after absorbing water to extrude an edge of the sealing member to move in a direction leaving an inner side of the drain outlet.

16 Claims, 7 Drawing Sheets

(52) U.S. Cl.
CPC ..... *F16K 99/0057* (2013.01); *Y10T 137/3021* (2015.04); *Y10T 137/304* (2015.04)

(58) Field of Classification Search
CPC ............ F16K 99/0055; F16K 99/0057; H01M 50/691; Y10T 137/304; Y10T 137/3021
See application file for complete search history.

(56) References Cited

U.S. PATENT DOCUMENTS

| | | | | |
|---|---|---|---|---|
| 2016/0172644 | A1 | 6/2016 | Goldman et al. | |
| 2017/0256834 | A1 | 9/2017 | Li | |
| 2017/0299219 | A1* | 10/2017 | Okabe | F16K 1/38 |
| 2018/0097214 | A1 | 4/2018 | Ogawa et al. | |

FOREIGN PATENT DOCUMENTS

| | | | | |
|---|---|---|---|---|
| CN | 103189675 | A | 7/2013 | |
| CN | 105186063 | A | 12/2015 | |
| CN | 105576320 | A | 5/2016 | |
| CN | 106627085 | A | 5/2017 | |
| CN | 108980508 | A | 12/2018 | |
| CN | 111827425 | A | 10/2020 | |
| CN | 112832227 | A | 5/2021 | |
| DE | 102009026222 | A1 * | 2/2011 | B62D 25/24 |
| DE | 102019206106 | A1 | 10/2020 | |
| DE | 102019216294 | A1 * | 4/2021 | F02M 35/088 |
| EP | 2533346 | A1 | 12/2012 | |
| KR | 20190128488 | A | 11/2019 | |

OTHER PUBLICATIONS

Machine English translation of DE-102019216294-A1 (Year: 2025).*

The European Patent Office (EPO) The Extended European Search Report for Application No. 23765775.4 Apr. 24, 2025 7 Pages.

China National Intellectual Property Administration (CNIPA) Office Action 1 for Application No. 202210227264.5 Oct. 24, 2023 13 Pages (including translation).

The World Intellectual Property Organization (WIPO) International Search Report and Written Opinion for PCT/CN2023/077234 May 25, 2023 13 Pages (including translation).

State Intellectual Property Office of China Notice of Grant of Invention Patent Right for Application No. 202210227264.5 Sep. 24, 2024 8 pages (including translation).

* cited by examiner

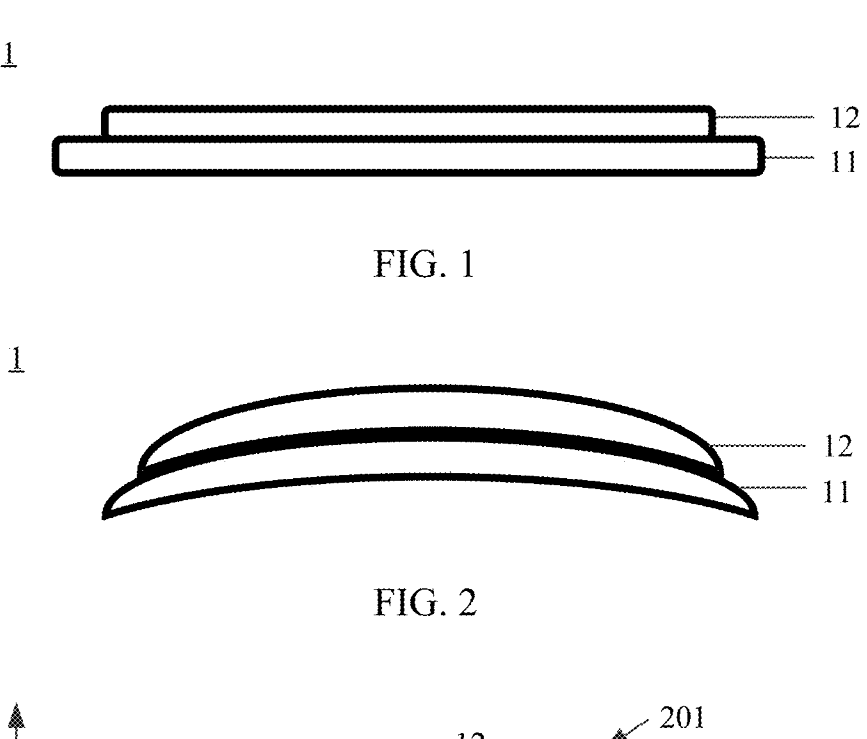
FIG. 1
FIG. 2
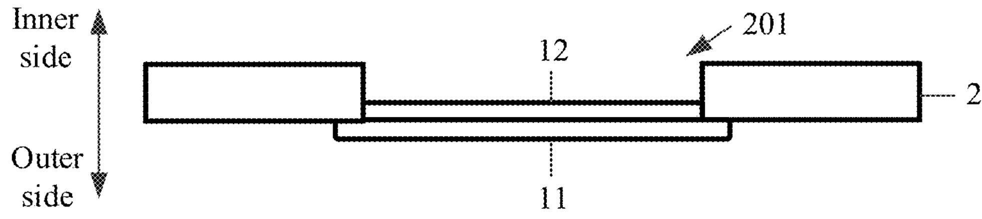
FIG. 3
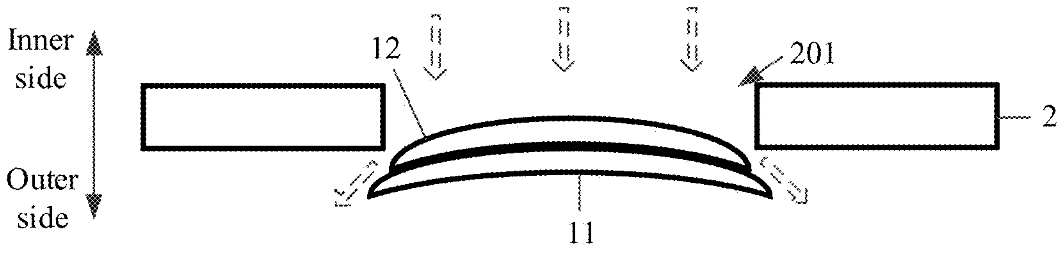
FIG. 4

DRAIN VALVE FOR BATTERY BOX, BATTERY, ELECTRIC APPARATUS, AND DRAINAGE METHOD

CROSS-REFERENCE TO RELATED APPLICATIONS

This application is a continuation of International Application No. PCT/CN2023/077234, filed on Feb. 20, 2023, which claims priority to Chinese Patent Application No. 202210227264.5, filed on Mar. 8, 2022 and entitled "DRAIN VALVE FOR BATTERY BOX, BATTERY, ELECTRIC APPARATUS, AND DRAINAGE METHOD", the entire contents of both of which are incorporated herein by reference.

TECHNICAL FIELD

This application relates to the field of batteries, and in particular, to a drain valve for battery box, a battery, an electric apparatus, and a drainage method.

BACKGROUND

Energy conservation and emission reduction are crucial to the sustainable development of the automobile industry. Electric vehicles, with their advantages in energy conservation and emission reduction, have become an important part of sustainable development of the automobile industry. For electric vehicles, battery technology is an important factor in connection with their development.

However, at present, after water enters a battery or a coolant in a battery leaks, it is difficult to drain the water or coolant in the battery, leading to the use risks of the battery.

SUMMARY

In view of the foregoing problem, this application provides a drain valve for battery box, a battery, an electric apparatus, and a drainage method, so as to alleviate the problem of use risks of the battery caused by difficulty in drainage of the battery after water enters the battery or a coolant in the battery leaks.

According to a first aspect, this application provides a drain valve for battery box. The drain valve is disposed at a drain outlet of a battery box. The drain valve includes a sealing member and an expansion member, where the sealing member is disposed on an outer side of a drain outlet, the expansion member is disposed on a side of the sealing member facing the drain outlet, and the expansion member is configured to expand after absorbing water to extrude an edge of the sealing member to move in a direction leaving an inner side of the drain outlet. In the technical solutions of embodiments of this application, the drain valve is connected to the drain outlet of the battery box to close the drain outlet. After water or a coolant in the battery box leaks, the water/coolant in the battery box comes into contact with the expansion member. The expansion member expands after absorbing water to extrude the sealing member, such that the edge of the sealing member bends and deforms in a direction leaving the battery box. In this way, a gap is formed between an outer side of the battery box and the sealing member, such that the water/coolant can be drained through the gap in a timely manner, thereby reducing the use risks of short circuit-induced fires, explosions, and the like in a battery. In addition, after the water/coolant in the battery box is completely drained, the expansion member shrinks due to water loss, such that the sealing member closes the drain outlet again under the action of its resilience force, thereby achieving an effect of resetting. Moreover, when thermal runaway occurs in the battery, the drain valve can also serve as an anti-explosion valve for degassing, with the advantages of reliable normal sealing and repeated use.

In some embodiments, the drain valve may further include a fixing assembly, where the fixing assembly is configured to fix the drain valve to the battery box. With the fixing assembly, the drain valve can be fixed to the drain outlet of the battery box.

In some embodiments, the sealing member is provided with a concave portion on the side facing the drain outlet, the concave portion is configured for accommodating the expansion member, and the expansion member expands to extrude the concave portion to move in the direction leaving the inner side of the drain outlet. The concave portion can limit the expansion member such that the expansion member can continuously extrude a fixed position of the sealing member in the concave portion, thereby allowing a drain gap to be quickly formed between the sealing member and the outer side of the battery box.

In some embodiments, the sealing member is plate-shaped, a plurality of convex strips are formed on a side surface of the sealing member, and two adjacent convex strips cooperate to define the concave portion. The concave portion is defined by the plurality of convex strips on a side of the sealing member, such that concave portions of different shapes can be made based on shapes of raw materials, for example, a strip-shaped concave portion and a ring-shaped concave portion.

In some embodiments, extension directions of the plurality of convex strips are consistent, and a first part of the convex strips are correspondingly located on one side of the center of the drain outlet, and a second part of the convex strips are correspondingly located on the other side of the center of the drain outlet. The plurality of convex strips are divided into a first part of convex strips and a second part of convex strips, and the two parts of convex strips are respectively located on two sides of the center of the drain outlet. In this way, after expansion members provided in the two parts of convex strips respectively expand to extrude sealing members, the sealing members located on two sides of the two parts of convex strips are more prone to bending and deforming, such that the drain gap can be further quickly formed.

In some embodiments, a distance between two adjacent convex strips in the first part of convex strips is equal to a distance between two adjacent convex strips in the second part of convex strips; and/or the first part of convex strips and the second part of convex strips are symmetrical, and a distance between the first part of convex strips and the second part of convex strips is greater than the distance between two adjacent convex strips in the first part of convex strips. The distance between two adjacent convex strips in the first part of convex strips is equal to the distance between two adjacent convex strips in the second part of convex strips, such that extrusion forces on the two parts tend to be balanced. The first part of convex strips and the second part of convex strips are symmetrical, and the distance between the first part of convex strips and the second part of convex strips is greater than the distance between two adjacent convex strips in the first part of convex strips, such that the position of the edge of the sealing member is more prone to bending and deforming, and thus the drain gap can be further quickly formed.

In some embodiments, the convex strips are ring-shaped, the plurality of convex strips are concentrically spaced apart, and the center of the ring overlaps an orthographic projection of the center of the drain outlet. The convex strips are ring-shaped, the plurality of convex strips are concentrically spaced apart, and the center of the ring overlaps the orthographic projection of the center of the drain outlet, such that the position of the edge of the sealing member is more prone to bending and deforming, and thus the drain gap can be further quickly formed.

In some embodiments, the expansion member is adhered and coupled in the concave portion of the sealing member; and/or the expansion member and the sealing member are integrally formed. In this way, the structural strength after connection between the sealing member and the expansion member can be improved.

In some embodiments, the fixing assembly includes a connecting member, a fastening member, and a bearing member, where a first side of the connecting member is attached to the outer side of the drain outlet, the fastening member is connected to both the connecting member and the inner side of the drain outlet, the bearing member is connected to a second side of the connecting member facing away from the first side, and the bearing member and the second side of the connecting member define a closed space. The connecting member, the fastening member, and the bearing member are respectively provided with a first through hole, a second through hole, and a third through hole that communicate with each other, the sealing member is disposed in the closed space, and the expansion member is opposite the first through hole. The sealing member and the expansion member are fixed to the drain outlet via the fixing assembly, and a channel is skillfully formed by the three through holes provided on the fixing assembly, allowing the scaling member and the expansion member to block or unblock the channel, thereby implementing drainage of the drain valve.

In some embodiments, an accommodating portion is recessed on a surface of the bearing member facing the second side of the connecting member, a connecting pillar extends from an inner wall of the bearing member in a direction facing the connecting member, the connecting pillar runs through the sealing member and is connected to the connecting member, and the surface of the second side of the connecting member abuts against an edge of the accommodating portion. After the bearing member is connected to the connecting member, a space can be defined for accommodating the sealing member and the expansion member.

In some embodiments, a penetrating pillar protrudes from the first side of the connecting member, the penetrating pillar runs through the drain outlet and is partially located on the inner side of the drain outlet, and the penetrating pillar is provided with an external thread. The fastening member is provided with an internal thread fitting with the external thread, and a turn of edge of the fastening member close to a side of the bearing member abuts against a turn of the inner side of the drain outlet. The penetrating pillar of the connecting member is connected to the fastening member in a threaded manner, such that the drain valve is more securely fixed to the drain outlet. In addition, a turn of edge of the fastening member close to a side of the bearing member abuts against a turn of the inner side of the drain outlet, thereby reducing the probability that the drain valve is disengaged from the drain outlet.

In some embodiments, the drain valve may further include a sealing ring, where the sealing ring is an elastic member, the sealing ring is disposed in a turn of groove in the first side of the connecting member, and a surface of the sealing ring facing away from the turn of groove abuts against a turn of the outer side of the drain outlet. The sealing ring is disposed in a turn of groove in the first side of the connecting member, and a surface of the sealing ring facing away from the turn of groove abuts against a turn of the outer side of the drain outlet, such that the sealing performance of the drain valve on the drain outlet can be improved.

According to a second aspect, this application provides a battery. The battery includes a battery box and the drain valve according to any one of the foregoing embodiments, where the battery box is provided with a drain outlet communicating with an inner side and outer side of the battery box, and the drain valve is connected to the drain outlet to close the drain outlet. The drain valve is provided at the drain outlet of the battery box of the battery, such that water/a coolant can be automatically drained after the water accidentally enters the battery box or the coolant in the battery box leaks, thereby reducing the use risks of the battery.

According to a third aspect, this application provides an electric apparatus. The electric apparatus includes the battery according to any one of the foregoing embodiments. The battery is disposed in the electric apparatus, such that the use safety of the battery is improved, thereby improving the use safety of the electric apparatus.

According to a fourth aspect, this application provides an automatic drainage method applied to the drain valve according to any one of the foregoing embodiments, where the drain valve is mounted on an outer side of a drain outlet of a battery box to close the drain outlet. The method includes: enabling a liquid in the battery box to come into contact with the expansion member of the drain valve; expanding by the expansion member to extrude sealing members on two sides of the expansion member; and bending edges of the extruded sealing members in a direction leaving the battery box to form gaps between the edges of the extruded sealing members and the battery box, where water is drained through the gaps.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the embodiments below. The accompanying drawings are merely intended to illustrate some embodiments and are not intended to limit this application. Moreover, throughout the accompanying drawings, the same reference signs represent the same parts. To describe the technical solutions of the embodiments of this application more clearly, the following briefly describes the accompanying drawings required for describing the embodiments. It is appreciated that the accompanying drawings below show merely some embodiments of this application and thus should not be considered as limitations on the scope. Persons of ordinary skill in the art may still derive other related drawings from the accompanying drawings without creative efforts. In the accompanying drawings:

FIG. 1 is a schematic cross-sectional view of a drain valve (a first embodiment) according to some embodiments of this application;

FIG. 2 is a schematic diagram of a drain valve (a first embodiment) after coming into contact with a liquid according to some embodiments of this application;

FIG. 3 is a schematic cross-sectional view of a drain valve (a first embodiment) after mounted at a drain outlet according to some embodiments of this application;

FIG. 4 is a schematic diagram of a drain valve (a first embodiment) after mounted at a drain outlet and coming into contact with a liquid according to some embodiments of this application;

Figure 5:
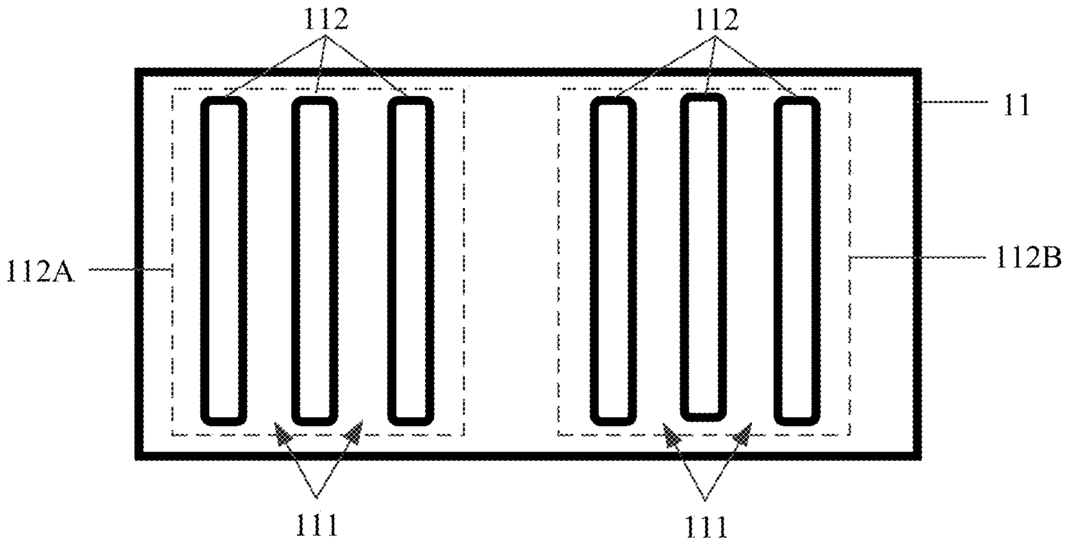
FIG. 5 is a schematic diagram of a sealing member of a drain valve (a second embodiment) according to some embodiments of this application.

Reference signs in the specific embodiments are described as follows:

1. drain valve for battery box; 11. sealing member; 111. concave portion; 112. convex strip; 112A. first part of convex strips; 112B. second part of convex strips; 12. expansion member; 13. fixing assembly; 131. connecting member; 1311. first through hole; 1312. penetrating pillar; 1313. a turn of groove; 132. fastening member; 1321. second through hole; 133. bearing member; 1331. third through hole; 1332. accommodating portion; 1333. connecting pillar; 14. sealing ring;

10. battery; 2. battery box; 201. drain outlet; 202. battery cell; and

100. electric apparatus.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by persons skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means at least two unless otherwise specifically stated.

In this specification, reference to "embodiment" means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of A, presence of both A and B, and presence of B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for case and brevity of description of the embodiments of this application rather than indicating or implying that the means or components mentioned must have specific orientations or must be constructed or manipulated according to specific orientations, and therefore shall not be construed as any limitations on embodiments of this application.

In the description of the embodiments of this application, unless otherwise specified and defined explicitly, the terms “mounting”, “connection”, “join”, and “fastening” should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skills in the art can understand specific meanings of these terms in this application as appropriate to specific situations.

Currently, from the perspective of market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of application fields of traction batteries, market demands for traction batteries are also increasing.

This applicant has noted that after water enters a battery or a coolant in a battery leaks, it is difficult to drain the water or coolant, leading to the use risks of the battery. The use risks herein may be short circuit-induced fires in the battery caused by connection of circuits in the battery due to the water/coolant in the battery, explosions of the battery, or other risks.

To alleviate the problem that the battery experiences the use risks due to the difficulty in drainage of the battery after water enters the battery or the coolant in the battery leaks, this applicant has found through research that a drain valve can be disposed at a drain outlet of the battery. After the water enters the battery or the coolant in the battery leaks, the drain valve is opened to drain the water/coolant, such that the use safety of the battery can be improved.

Based on the foregoing considerations, to alleviate the problem that the battery experiences the use risks due to the difficulty in drainage of the battery after water enters the battery or the coolant in the battery leaks, this applicant has designed a drain valve through in-depth research. The drain valve is closed on an outer side of a drain outlet, and the drain valve is provided with an expansion member on a surface corresponding to an inner side of the drain outlet. The expansion member expands after coming into contact with the water/coolant to extrude an edge of a sealing member, such that the edge of the sealing member moves in a direction leaving the inner side of the drain outlet. In this way, a gap is present between the edge of the sealing member and the outer side of the drain outlet, such that the water/coolant can be drained through the gap.

Figure 6:
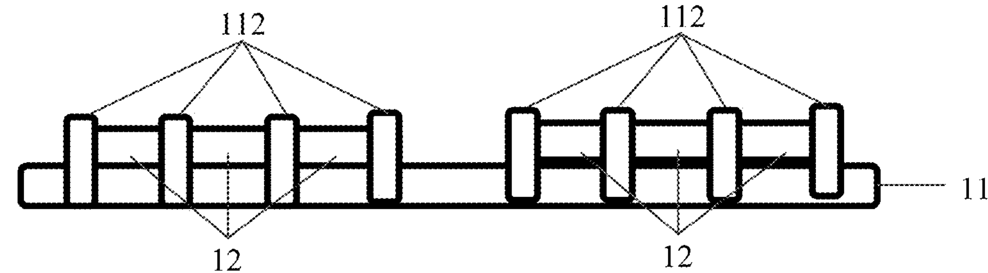
FIG. 6 is a schematic cross-sectional view of a drain valve (a second embodiment) according to some embodiments of this application.
Figure 7:
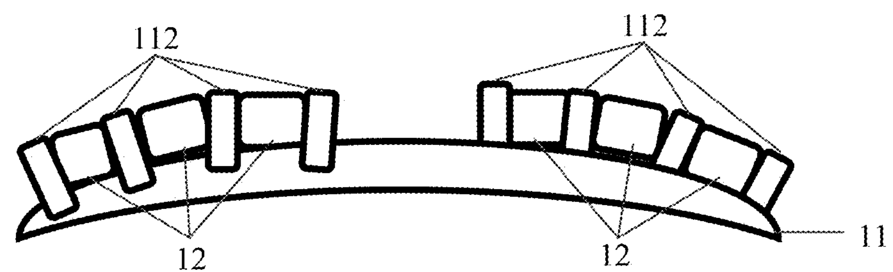
FIG. 7 is a schematic diagram of a drain valve (a second embodiment) after coming into contact with a liquid according to some embodiments of this application.
Figure 8:
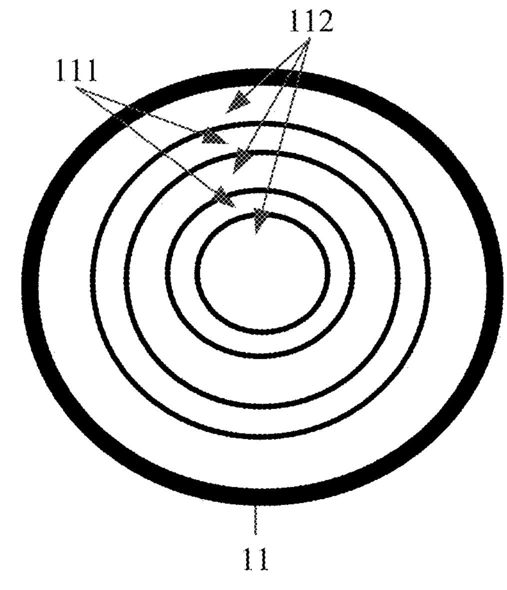
FIG. 8 is a schematic diagram of a sealing member of a drain valve (a third embodiment) according to some embodiments of this application.
Figure 9:
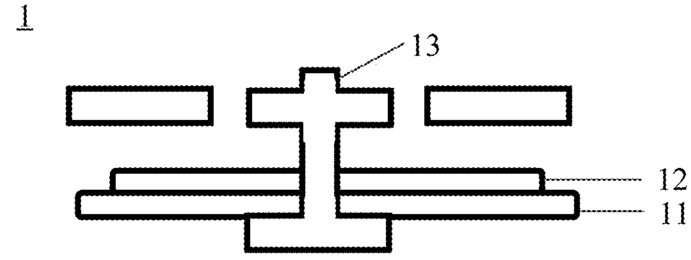
FIG. 9 is a schematic cross-sectional view of a drain valve (a fourth embodiment) according to some embodiments of this application.
Figure 10:
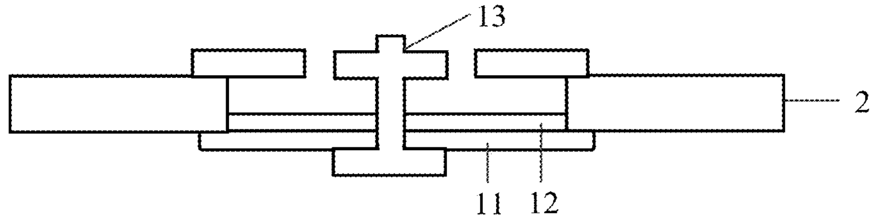
FIG. 10 is a schematic cross-sectional view of a drain valve (a fourth embodiment) after mounted at a drain outlet according to some embodiments of this application.
Figure 11:
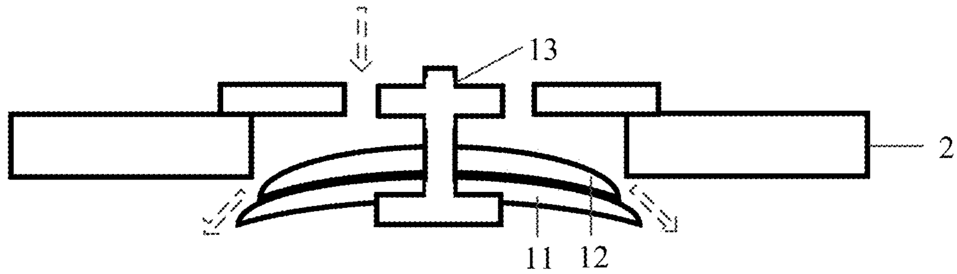
FIG. 11 is a schematic diagram of a drain valve (a fourth embodiment) after mounted at a drain outlet and coming into contact with a liquid according to some embodiments of this application.
Figure 12:
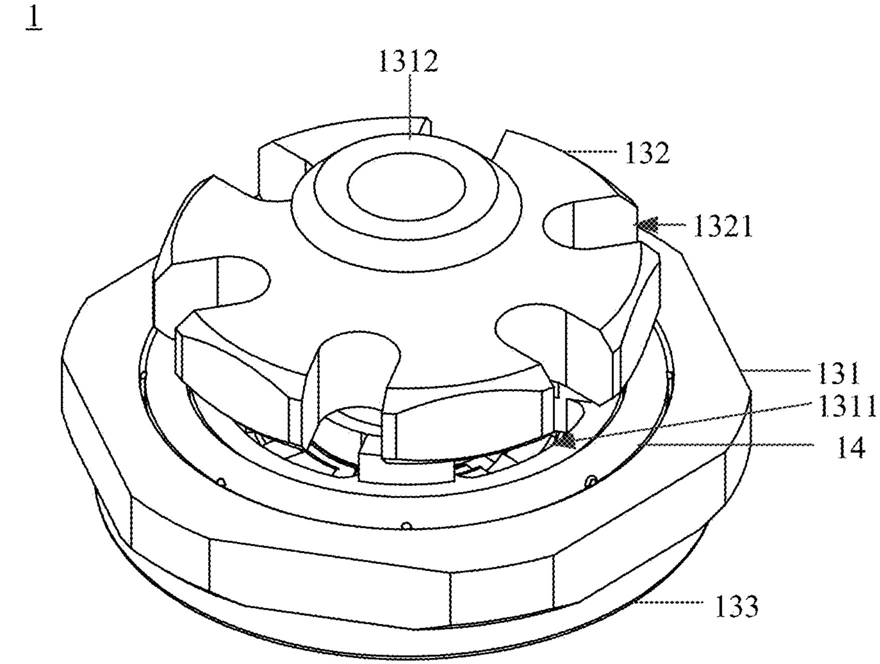
FIG. 12 is a schematic structural diagram of a drain valve (a fifth embodiment) according to some embodiments of this application.
Figure 13:
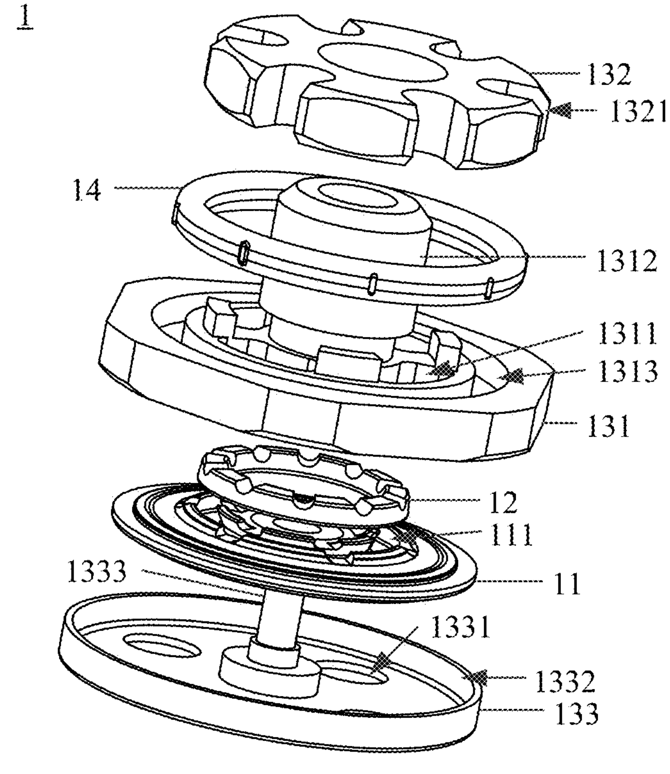
FIG. 13 is a three-dimensional schematic exploded view of a drain valve (a fifth embodiment) according to some embodiments of this application.
Figure 14:
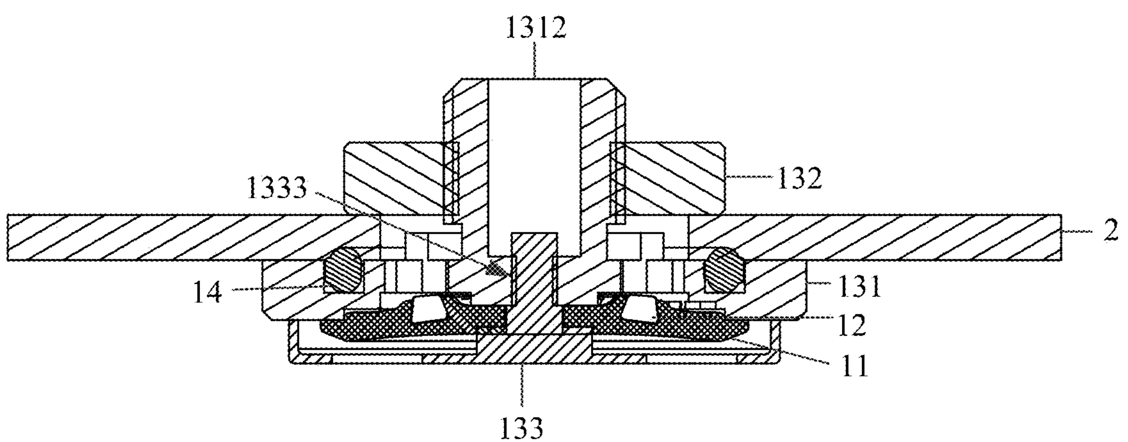
FIG. 14 is a schematic cross-sectional view of a drain valve (a fifth embodiment) according to some embodiments of this application.
Figure 15:
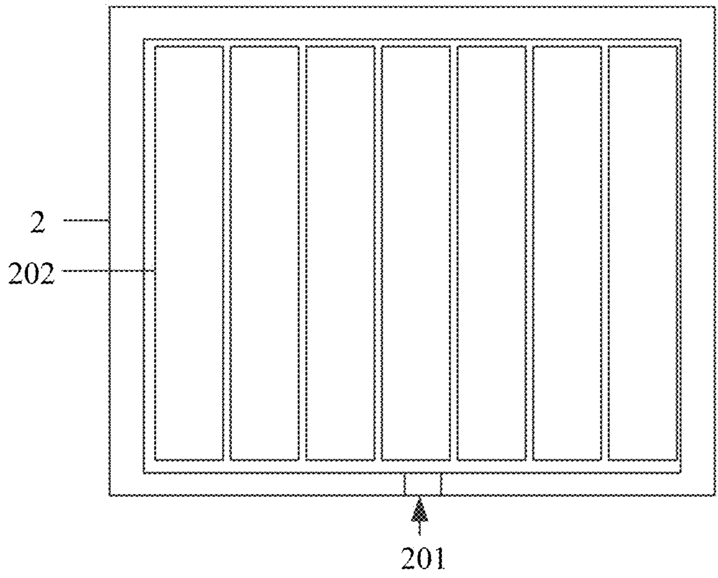
FIG. 15 is a schematic structural diagram of a battery according to some embodiments of this application.
Figure 16:
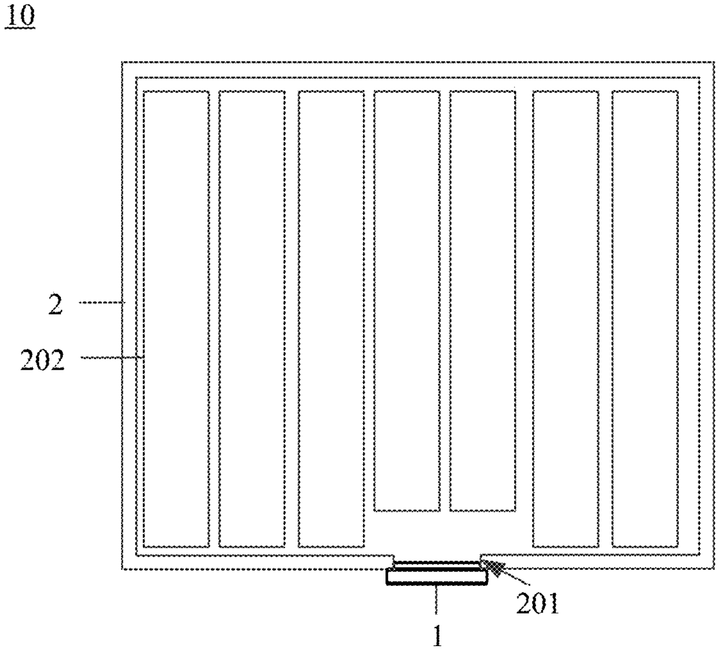
FIG. 16 is a schematic structural diagram of a battery mounted with a drain valve according to some embodiments of this application.

According to some embodiments of this application, refer to FIG. 1 and further refer to FIG. 2 to FIG. 16. FIG. 1 is a schematic cross-sectional view of a drain valve (a first embodiment) according to some embodiments of this application. FIG. 2 is a schematic diagram of a drain valve (a first embodiment) after coming into contact with a liquid according to some embodiments of this application. FIG. 3 is a schematic cross-sectional view of a drain valve (a first embodiment) after mounted at a drain outlet according to some embodiments of this application. FIG. 4 is a schematic diagram of a drain valve (a first embodiment) after mounted at a drain outlet and coming into contact with a liquid according to some embodiments of this application. FIG. 5 is a schematic diagram of a sealing member of a drain valve (a second embodiment) according to some embodiments of this application. FIG. 6 is a schematic cross-sectional view of a drain valve (a second embodiment) according to some embodiments of this application. FIG. 7 is a schematic diagram of a drain valve (a second embodiment) after coming into contact with a liquid according to some embodiments of this application. FIG. 8 is a schematic diagram of a sealing member of a drain valve (a third embodiment) according to some embodiments of this application. FIG. 9 is a schematic cross-sectional view of a drain valve (a fourth embodiment) according to some embodiments of this application. FIG. 10 is a schematic cross-sectional view of a drain valve (a fourth embodiment) after mounted at a drain outlet according to some embodiments of this application. FIG. 11 is a schematic diagram of a drain valve (a fourth embodiment) after mounted at a drain outlet and coming into contact with a liquid according to some embodiments of this application. FIG. 12 is a schematic structural diagram of a drain valve (a fifth embodiment) according to some embodiments of this application. FIG. 13 is a three-dimensional schematic exploded view of a drain valve (a fifth embodiment) according to some embodiments of this application. FIG. 14 is a schematic cross-sectional view of a drain valve (a fifth embodiment) according to some embodiments of this application. FIG. 15 is a schematic structural diagram of a battery according to some embodiments of this application. FIG. 16 is a schematic structural diagram of a battery mounted with a drain valve according to some embodiments of this application. Dashed arrows in FIG. 4 and FIG. 11 are flow paths of water/coolant in a battery box 2. This application provides a drain valve 1 for battery box, where the drain valve 1 is disposed at a drain outlet 201 of a battery box 2. The drain valve 1 for battery box includes a sealing member 11 and an expansion member 12, where the sealing member 11 is disposed on an outer side of a drain outlet 201, the expansion member 12 is disposed on a side of the sealing member 11 facing the drain outlet 201, and the expansion member 12 is configured to expand after absorbing water so as to extrude an edge of the sealing member 11 to move in a direction leaving an inner side of the drain outlet 201.

The drain valve 1 is disposed at the drain outlet 201 of the battery box 2 to close the drain outlet 201.

The sealing member 11 is disposed on the outer side of the drain outlet 201. However, after the sealing member 11 is disposed on the outer side of the drain outlet 201, the sealing member 11 may independently close the drain outlet 201 or may cooperate with other structural members to close the drain outlet 201. For example, the sealing member 11 cooperates with a fixing assembly 13 described below to close the drain outlet 201. A radial dimension of the sealing member 11 may be greater than a hole diameter of the drain outlet 201 such that the sealing member 11 can independently close the drain outlet 201. Alternatively, the radial dimension of the sealing member 11 may be equal to or less than the hole diameter of the drain outlet 201 such that the sealing member 11 cooperates with other structural members to close the drain outlet 201. The sealing member 11 may be umbrella-shaped, round, or rectangular, or of other irregular shapes. The sealing member 11 is a structural member made of an elastic material such as silica gel and rubber. The sealing member 11 satisfies the requirements for IPX8 sealing grades.

The expansion member 12 may be adhered to the side of the sealing member 11 facing the drain outlet 201 or adhered and coupled to the side of the sealing member 11 facing the drain outlet 201. The expansion member 12 may be arranged circumferentially or linearly on the side of the scaling member 12 facing the drain outlet 201. The expansion member 12 may be round, rectangular, strip-shaped, or ring-shaped, or of other shapes. The radial dimension of the expansion member 12 may be equal to the hole diameter of the drain outlet 201 or less than the hole diameter of the drain outlet 201. The expansion member 12 may be made of a material such as super absorbent resin, polyacrylate, or cellulose. Water absorption expansion rate of the expansion member 12 is greater than that of the sealing member 11.

In these embodiments, the drain valve 1 is connected to the drain outlet 201 of the battery box 2 to close the drain outlet 201. After water or a coolant in the battery box 2 leaks, the water/coolant in the battery box 2 comes into contact with the expansion member 12. The expansion member 12 expands after absorbing water to extrude the sealing member 11, such that the edge of the sealing member 11 bends and deforms in a direction leaving the battery box 2. In this way, a gap is formed between an outer side of the battery box 2 and the sealing member 11, such that the water/coolant can be drained through the gap in a timely manner, thereby reducing the use risks of short circuit-induced fires, explosions, and the like in a battery 10. In addition, after the water/coolant in the battery box 2 is completely drained, the expansion member 12 shrinks due to water loss, such that the sealing member 11 closes the drain outlet 201 again under the action of its resilience force, thereby achieving an effect of resetting. Moreover, when thermal runaway occurs in the battery 10, the drain valve 1 can also serve as an anti-explosion valve for degassing, with the advantages of reliable normal sealing and repeated use.

It should be noted that in the foregoing embodiments, the sealing member 11 and/or the expansion member 12 is directly connected to the battery box 2 so as to fix the drain valve 1 to the drain outlet 201. Alternatively, the fixing assembly 13 described below is connected to the scaling member 11 or the expansion member 12 and the battery box 2 so as to fix the drain valve 1 to the drain outlet 201. When the sealing member 11 is directly connected to the battery box 2 so as to fix the drain valve 1 to the drain outlet 201, at least a portion of the edge of the sealing member 11 is not directly connected to the battery box 2, thereby ensuring that a drain gap is formed between the sealing member 11 and the battery box 2.

According to some embodiments of this application, referring to FIGS. 9 to 14, the drain valve 1 further includes a fixing assembly 13, where the fixing assembly 13 is configured to fix the drain valve 1 to the battery box 2. With the fixing assembly 13, the drain valve 1 can be fixed to the drain outlet 201 of the battery box 2.

According to some embodiments of this application, referring to FIGS. 5 to 8, the sealing member 11 is provided with a concave portion 111 on the side facing the drain outlet 201, the concave portion 111 is configured for accommodating the expansion member 12, and the expansion member 12 expands to extrude the concave portion 111 to move in the direction leaving the inner side of the drain outlet 201.

The concave portion 111 may be strip-shaped or ring-shaped, or of other shapes.

The expansion member 12 is disposed in the concave portion 111. The expansion member 12 may be adhered in the concave portion 111, adhered and coupled in the concave portion 111, or fixed in the concave portion 111 in other manners. The width of the expansion member 12 may be the same as that of the concave portion 111 or slightly greater than that of the concave portion 111. The expansion member 12 expands to extrude the concave portion 111 to move in the direction leaving the inner side of the drain outlet 201, that is, the expansion member 12 expands to extrude an inner wall of the concave portion 111, allowing the sealing member 11 to bend and deform, thereby allowing the drain gap to be formed between the edge of the scaling member 11 and an outer side of the battery box 2.

In these embodiments, the concave portion 111 can limit the expansion member 12 such that the expansion member 12 can continuously extrude a fixed position of the scaling member 11 in the concave portion 111, thereby allowing the drain gap to be quickly formed between the sealing member 11 and the outer side of the battery box 2.

According to some embodiments of this application, referring to FIGS. 5 to 8, the sealing member 11 is plate-shaped, a plurality of convex strips 112 are formed on a side surface of the sealing member 11, and two adjacent convex strips 112 cooperate to define the concave portion 111.

The convex strip 112 and the sealing member 11 may be integrally formed, such that the structural strength after connection between the convex strip 112 and the sealing member 11 can be improved. The convex strip 112 and the sealing member 11 may be made of same or different materials.

In these embodiments, the concave portion 111 is defined by the plurality of convex strips 112 on a side of the sealing member 11, such that concave portions 111 of different shapes can be made based on shapes of raw materials, for example, a strip-shaped concave portion 111 and a ring-shaped concave portion 111.

According to some embodiments of this application, referring to FIGS. 5 to 7, extension directions of the plurality of convex strips 112 are consistent, and a first part of the convex strips 112A are correspondingly located on one side of the center of the drain outlet 201, and a second part of the convex strips 112B are correspondingly located on the other side of the center of the drain outlet 201.

The extension directions of the plurality of convex strips 112 are consistent, that is, the plurality of convex strips 112 are parallel to each other.

In these embodiments, the plurality of convex strips 112 are divided into the first part of convex strips 112A and the second part of convex strips 112B, and the two parts of convex strips 112 are respectively located on two sides of the center of the drain outlet 201. In this way, after expansion members 12 provided in the two parts of convex strips 112 respectively expand to extrude sealing members 11, and the sealing members 11 located on two sides of the two parts of convex strips 112 are more prone to bending and deforming, such that the drain gap can be further quickly formed.

According to some embodiments of this application, referring to FIGS. 5 and 6, a distance between two adjacent convex strips 112 in the first part of convex strips 112A is equal to a distance between two adjacent convex strips 112 in the second part of convex strips 112B; and/or the first part of convex strips 112A and the second part of convex strips 112B are symmetrical, and a distance between the first part of convex strips 112A and the second part of convex strips 112B is greater than the distance between two adjacent convex strips 112 in the first part of convex strips 112A.

The distance between two adjacent convex strips 112 in the first part of convex strips 112A is equal to the distance between two adjacent convex strips 112 in the second part of convex strips 112B, that is, the widths of all the concave portions 111 in the sealing member 11 are the same constant.

The first part of convex strips 112A and the second part of convex strips 112B are symmetrical, that is, the first part of convex strips 112A and the second part of convex strips 112B are the same in quantity, and the distance between two adjacent convex strips 112 in the first part of convex strips 112A is equal to the distance between two adjacent convex strips 112 in the second part of convex strips 112B.

In these embodiments, the distance between two adjacent convex strips 112 in the first part of convex strips 112A is equal to the distance between two adjacent convex strips 112 in the second part of convex strips 112B, such that extrusion forces on the two parts tend to be balanced. The first part of convex strips 112A and the second part of convex strips 112B are symmetrical, and the distance between the first part of convex strips 112A and the second part of convex strips 112B is greater than the distance between two adjacent convex strips 112 in the first part of convex strips 112A, such that the position of the edge of the sealing member 11 is more prone to bending and deforming, and thus the drain gap can be further quickly formed.

According to some embodiments of this application, referring to FIG. 8, the convex strips 112 are ring-shaped, the plurality of convex strips 112 are concentrically spaced apart, and the center of the ring overlaps an orthographic projection of the center of the drain outlet 201.

The convex strips 112 are ring-shaped and the plurality of convex strips 112 are concentrically spaced apart, so as to form the ring-shaped concave portion 111.

In these embodiments, the convex strips 112 are ring-shaped, the plurality of convex strips 112 are concentrically spaced apart, and the center of the ring overlaps the orthographic projection of the center of the drain outlet 201, such that the position of the edge of the sealing member 11 is more prone to bending and deforming, and thus the drain gap can be further quickly formed.

According to some embodiments of this application, the expansion member 12 is adhered and coupled in the concave portion 111 of the sealing member 11; and/or the expansion member 12 and the sealing member 11 are integrally formed. In this way, the structural strength after connection between the sealing member 11 and the expansion member 12 can be improved.

According to some embodiments of this application, referring to FIGS. 12 to 14, the fixing assembly 13 includes a connecting member 131, a fastening member 132, and a bearing member 133, where a first side of the connecting member 131 is attached to the outer side of the drain outlet 201, the fastening member 132 is connected to both the connecting member 131 and the inner side of the drain outlet 201, the bearing member 133 is connected to a second side of the connecting member 131 facing away from the first side, and the bearing member 133 and the second side of the connecting member 131 define a closed space. The connecting member 131, the fastening member 132, and the bearing member 133 are respectively provided with a first through hole 1311, a second through hole 1321, and a third through hole 1331 that communicate with each other, the sealing member 11 is disposed in the closed space, and the expansion member 12 is opposite the first through hole 1311.

The connecting member 131 and the bearing member 133 cooperate to cover the outer side of the drain outlet 201, and then the connecting member 131 and the bearing member 133 are fixed to the drain outlet 201 via the fastening member 132. The connecting member 131, the fastening member 132, and the bearing member 133 are respectively provided with the first through hole 1311, the second through hole 1321, and the third through hole 1331 that communicate with each other. The first through hole 1311, the second through hole 1321, and the third through hole 1331 cooperate to form a channel communicating with an inner side and outer side of the battery box 2. The connecting member 131 and the bearing member 133 cooperate to define a closed space for accommodating the sealing member 11 and the expansion member 12. After disposed in the closed space, the sealing member 11 and the expansion member 12 block a channel between the connecting member 131 and the bearing member 133. In addition, after the expansion member 12 expands to extrude the sealing member 11, the sealing member 11 bends and deforms such that the connecting member 131 and the bearing member 133 are connected via a gap formed in the edge of the sealing member 11, allowing the channel to be unblocked, thereby allowing the water/coolant in the battery box 2 to be drained through the channel.

A size of the closed space may be greater than, less than, or equal to a sum of sizes of the sealing member 11 and the expansion member 12. Both the sealing member 11 and the expansion member 12 are compressed by mutual extrusion between the connecting member 131 and the bearing member 133, and the compression deformation of the sealing member 11 and the expansion member 12 can block the channel between the connecting member 131 and the bearing member 133.

In these embodiments, the sealing member 11 and the expansion member 12 are fixed to the drain outlet 201 via the fixing assembly 13, and a channel is skillfully formed by the three through holes provided on the fixing assembly 13, allowing the sealing member 11 and the expansion member 12 to block or unblock the channel, thereby implementing drainage of the drain valve 1.

According to some embodiments of this application, referring to FIGS. 13 and 14, an accommodating portion 1332 is recessed on a surface of the bearing member 133 facing the second side of the connecting member 131, a connecting pillar 1333 extends from an inner wall of the bearing member 133 in a direction facing the connecting member 131, the connecting pillar 1333 runs through the sealing member 11 and is connected to the connecting member 131, and the surface of the second side of the connecting member 131 abuts against an edge of the accommodating portion 1332.

The connecting pillar 1333 and the connecting member 131 may be threaded or snap-fitted. For example, the connecting pillar 1333 is provided with an external thread, and the connecting member 131 is provided with a corresponding internal thread. The external thread and the internal thread are connected to implement connection between the connecting pillar 1333 and the connecting member 131. Due to the presence of the first through hole 1311, a corresponding inner edge and outer edge are formed on the connecting member 131. The inner edge of the connecting member 131 close to an edge of the bearing member 133 is of an expanding trapezoid in a direction from the connecting member 131 to the bearing member 133. The sealing member 11 is compressed between the trapezoid and the bearing member 133, allowing the sealing member 11 to better block the channel between the connecting member 131 and the bearing member 133.

In these embodiments, the bearing member 133 being connected to the connecting member 131 can define a space for accommodating the sealing member 11 and the expansion member 12.

In this case, accommodating portion may be disposed on a surface of the connecting member 131 facing the bearing member 133, thereby providing flexible selections based on actual situations (such as shapes of raw materials).

According to some embodiments of this application, referring to FIGS. 13 and 14, a penetrating pillar 1312 protrudes from the first side of the connecting member 131, the penetrating pillar 1312 runs through the drain outlet 201 and is partially located on the inner side of the drain outlet 201, and the penetrating pillar 1312 is provided with an external thread. The fastening member 132 is provided with an internal thread fitting with the external thread, and a turn of edge of the fastening member 132 close to a side of the bearing member 133 abuts against a turn of the inner side of the drain outlet 201.

In these embodiments, the penetrating pillar 1312 of the connecting member 131 is connected to the fastening member 132 in a threaded manner, such that the drain valve 1 is more securely fixed to the drain outlet 201. In addition, a turn of edge of the fastening member 132 close to a side of the bearing member 133 abuts against a turn of the inner side of the drain outlet 201, thereby reducing the probability that the drain valve 1 is disengaged from the drain outlet 201.

According to some embodiments of this application, referring to FIGS. 12 to 14, the drain valve 1 may further include a sealing ring 14, where the sealing ring 14 is an elastic member, the sealing ring 14 is disposed in a turn of groove 1313 in the first side of the connecting member 131, and a surface of the sealing ring 14 facing away from the turn of groove 1313 abuts against a turn of the outer side of the drain outlet 201.

The sealing ring 14 is a structural member made of an elastic material such as silica gel and rubber.

In these embodiments, the sealing ring 14 is disposed in a turn of groove 1313 in the first side of the connecting member 131, and a surface of the sealing ring 14 facing away from the turn of groove 1313 abuts against a turn of the outer side of the drain outlet 201, thereby improving the sealing performance of the drain valve 1 on the drain outlet 201.

According to some embodiments of this application, referring to FIGS. 15 and 16, this application further provides a battery 10. The battery 10 includes a battery box 2 and the drain valve 1 according to any one of the foregoing solutions. The battery box 2 is provided with a drain outlet 201 communicating an inner side and outer side of the battery box 2. The drain valve 1 is connected to the drain outlet 201 to close the drain outlet 201.

The battery box 2 is configured to provide a space for accommodating a battery cell 202. The battery box 2 may be a variety of structures. In some embodiments, the battery box 2 may include a first portion and a second portion. The first portion and the second portion fit with each other such that the first portion and the second portion jointly define an accommodating space for accommodating the battery cell 202. The second portion may be a hollow structure with an opening at one end, and the first portion may be a plate-shaped structure, where the first portion covers the opening side of the second portion such that the first portion and the second portion jointly define an accommodating space. Alternatively, the first portion and the second portion may both be hollow structures with an opening at one side, where the opening side of the first portion fits with the opening side of the second portion. Certainly, the battery box 2 formed by the first portion and the second portion may be in a variety of shapes, for example, cylinder or cuboid.

The battery cell 202 may be a secondary battery or a primary battery, a lithium-sulfur battery, a sodium-ion battery, or a magnesium-ion battery, without being limited thereto. The battery cell 202 may be cylindrical, flat, cuboid, or of other shapes. The battery cell 202 refers to a smallest element constituting the battery 10. The battery cell 202 may include an end cover, a housing, a cell assembly and other functional components.

The end cover refers to a component that covers an opening of the housing to isolate an internal environment of the battery cell 202 from an external environment. Without limitation, a shape of the end cover may fit with that of the housing, such that the end cover can match the housing. In some embodiments, the end cover may be made of a material with given hardness and strength (for example, aluminum alloy), such that the end cover is less likely to deform when subjected to extrusion and collision, allowing the battery cell 202 to have higher structural strength and enhanced safety performance. The end cover may be provided with functional components such as an electrode terminal. The electrode terminal may be configured to be electrically connected to the electrode assembly for outputting or inputting electrical energy of the battery cell 202. In some embodiments, the end cover may further be provided with a pressure relief mechanism configured to relieve internal pressure when the internal pressure or temperature of the battery cell 202 reaches a threshold. The end cover may alternatively be made of various materials, such as copper, iron, aluminum, stainless steel, aluminum alloy, and plastic, which are not particularly limited in the embodiments of this application. In some embodiments, an insulator may also be disposed on an inner side of the end cover. The insulator can be configured to isolate electrical connection parts in the housing from the end cover, reducing the risk of short circuit. For example, the insulator may be made of plastic, rubber, or the like.

The housing is a component configured to form the internal environment of the battery cell 202 together with the end cover, where the formed internal environment may be used to accommodate the cell assembly, an electrolyte, and other components. The housing and the end cover may be independent components, and an opening may be provided in the housing, such that the end cover covers the opening to form the internal environment of the battery cell. Without limitation, the end cover and the housing may alternatively be integrated. Specifically, the end cover and the housing may form a shared connection surface before other components are disposed inside the housing, and then the end cover covers the housing when the inside of the housing needs to be enclosed. The housing may be of various shapes and sizes, such as a cuboid, a cylinder, and a hexagonal prism. Specifically, the shape of the housing may be determined based on a specific shape and size of the cell assembly. The housing may be made of various materials, such as copper, iron, aluminum, stainless steel, aluminum alloy, and plastic, which are not particularly limited in the embodiments of this application.

The cell assembly is a component in which electrochemical reactions take place in the battery cell. There may be one or more battery assemblies in the housing. The cell assembly is mainly formed by winding or stacking a positive electrode plate and a negative electrode plate, and a separator is typically disposed between the positive electrode plate and the negative electrode plate. Parts of the positive electrode plate and the negative electrode plate with active substances constitute a body portion of the cell assembly, while parts of the positive electrode plate and the negative electrode plate without active substances separately constitute a tab. A positive tab and a negative tab may both be located at one end of the body portion or be located at two ends of the body portion respectively. During charge and discharge of the battery, a positive electrode active substance and a negative electrode active substance react with an electrolyte, and the tabs are connected to the electrode terminals to form a current loop.

In the battery box 2 of the battery 10, one or a plurality of battery cells 202 may be provided. When a plurality of battery cells 202 are provided in the battery box 2, any two battery cells 202 may be consistent or inconsistent in shape and size.

When a plurality of battery cells 202 are provided in the battery box 2 of the battery 10, the plurality of battery cells 202 may be connected in series, parallel, or series-parallel, where being connected in series-parallel means a combination of series and parallel connections of the plurality of battery cells 202. The plurality of battery cells 202 may be directly connected in series, parallel or series-parallel, and then an entirety of the plurality of battery cells 202 is accommodated in the battery box 2; or certainly, the battery 10 may be formed by a plurality of battery cells 202 being connected in series, parallel or series-parallel first to form a battery module and then a plurality of battery modules being connected in series, parallel or series-parallel to form an entirety which is accommodated in the battery box 2. The battery 10 may further include other structures. For example, the battery 10 may further include a busbar configured to implement electrical connection between the plurality of battery cells 202.

The battery 10 may be used in, but is not limited to, electric apparatuses such as vehicles, ships, or aircrafts. The battery 10 may be used to constitute a power supply system of that electric apparatus.

In these embodiments, the drain valve 1 is provided at the drain outlet 201 of the battery box 2 of the battery 10, such that water/a coolant can be automatically drained after the water accidentally enters the battery box 2 or the coolant in the battery box 2 leaks, thereby reducing the use risks of the battery.

According to some embodiments of this application, referring to FIGS. 15 and 16, the drain outlet 201 is located at the bottom of the battery box 2 of the battery 10.

Figure 17:
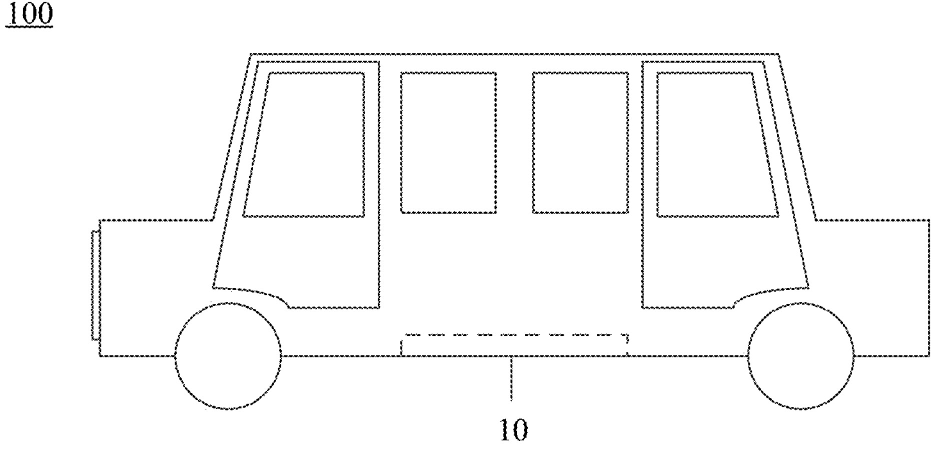
FIG. 17 is a schematic structural diagram of an electric apparatus according to some embodiments of this application.

According to some embodiments of this application, referring to FIG. 17, this application further provides an electric apparatus 100, where the electric apparatus 100 includes the battery cell 10 according to any one of the foregoing solutions.

The electric apparatus 100 may be but is not limited to a mobile phone, a tablet, a laptop computer, an electric toy, an electric tool, an electric bicycle, an electric car, a ship, or a spacecraft. The electric toy may include a fixed or mobile electric toy, for example, a game console, an electric toy car, an electric toy ship, and an electric toy airplane. The spacecraft may include an airplane, a rocket, a space shuttle, a spaceship, and the like.

In these embodiments, the battery 10 is disposed in the electric apparatus 100, such that the use safety of the battery 10 is improved, thereby improving the use safety of the electric apparatus 100.

In some embodiments of this application, referring to FIG. 17, the electric apparatus 100 is a vehicle. The vehicle may be a fossil fuel vehicle, a natural-gas vehicle, or a new energy vehicle, where the new energy vehicle may be a battery electric vehicle, a hybrid electric vehicle, a range-extended vehicle, or the like. The vehicle is provided with the battery 10 inside, where the battery 10 may be disposed at the bottom, front or rear of the vehicle. The battery 10 may be configured to supply power to the vehicle. For example, the battery 10 may be used as an operational power source for the vehicle. The vehicle may further include a controller and a motor, and the controller is configured to control the battery 10 to supply power to the motor, for example, to satisfy operating power needs during start, navigation, and traveling of the vehicle.

In some embodiments of this application, the battery 10 can be used as not only the operational power source for the vehicle but also a driving power source for the vehicle, replacing or partially replacing fossil fuel or natural gas to provide driving traction for the vehicle.

Figure 18:
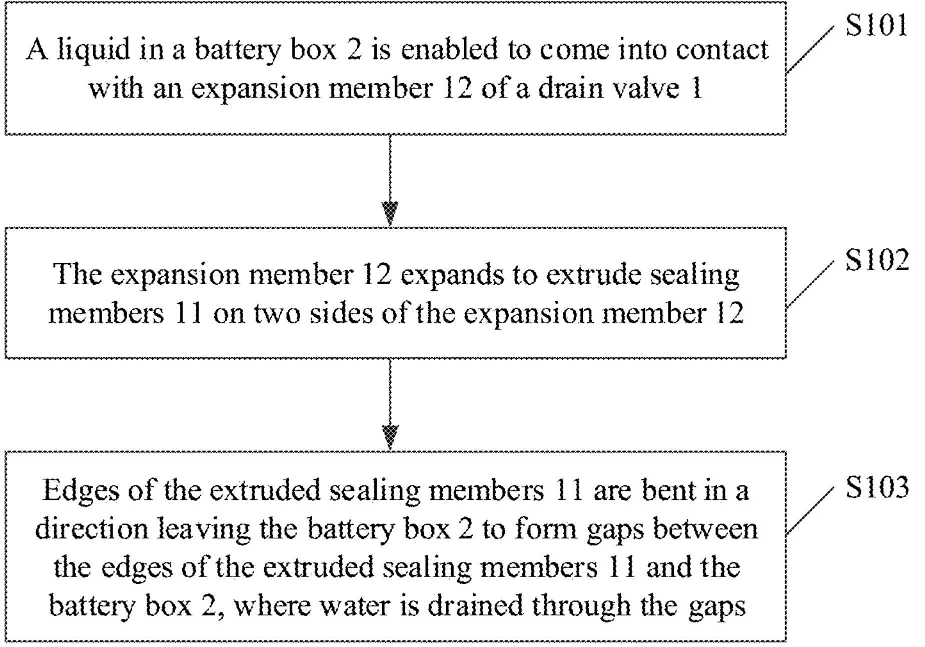
FIG. 18 is a flowchart of an automatic drainage method according to some embodiments of this application.

According to some embodiments of this application, referring to FIG. 18, this application further provides an automatic drainage method applied to the drain valve 1 according to any one of the foregoing solutions, where the drain valve 1 is mounted on an outer side of a drain outlet 201 of a battery box 2 to close the drain outlet 201. The method includes: enabling a liquid in the battery box 2 to come into contact with the expansion member 12 of the drain valve 1; expanding by the expansion member 12 to extrude sealing members 11 on two sides of the expansion member 12; and bending edges of the extruded sealing members 11 in a direction leaving the battery box 2 to form gaps between the edges of the extruded sealing members 11 and the battery box 2, where water is drained through the gaps.

In a specific embodiment, referring to FIGS. 1 to 16, a drain valve 1 for battery box is mounted on an outer side of a drain outlet 201 of a battery box 2 to close the drain outlet 201. The drain valve 1 for battery box includes:

a fixing assembly 13, where the fixing assembly 13 includes a connecting member 131, a fastening member 132, and a bearing member 133, where a first side of the connecting member 131 is attached to the outer side of the drain outlet 201, a penetrating pillar 1312 protrudes from the first side of the connecting member 131, and the penetrating pillar 1312 runs through the drain outlet 201 and is partially located on an inner side of the drain outlet 201. The penetrating pillar 1312 is provided with an external thread. The fastening member 132 is provided with an internal thread fitting with the external thread, and a turn of edge of the fastening member 132 close to a side of the bearing member 133 abuts against a turn of the inner side of the drain outlet 201. The bearing member 133 is connected to a second side of the connecting member 131 facing away from the first side. An accommodating portion 1332 is recessed on a surface of the bearing member 133 facing the second side of the connecting member 131. A connecting pillar 1333 extends from an inner wall of the bearing member 133 in a direction facing the connecting member 131, and the connecting pillar 1333 runs through the sealing member 11 and is connected to the connecting member 131. A surface of the second side of the connecting member 131 abuts against an edge of the accommodating portion 1332, such that the bearing member 133 and the second side of the connecting member 131 define a closed space. The connecting member 131, the fastening member 132, and the bearing member 133 are respectively provided with a first through hole 1311, a second through hole 1321, and a third through hole 1331 that communicate with each other.

The drain valve 1 further includes a sealing member 11, where the sealing member 11 is disposed in the closed space;

an expansion member 12, where the expansion member 12 is disposed on a side of the scaling member 11 facing the drain outlet 201, the expansion member 12 is opposite the first through hole 1311, and the expansion member 12 is configured to expand after absorbing water so as to extrude an edge of the sealing member 11 to move in a direction leaving the inner side of the drain outlet 201; and a sealing ring 14, where the sealing ring 14 is an elastic member, the sealing ring 14 is disposed in a turn of groove 1313 in the first side of the connecting member 131, and a surface of the sealing ring 14 facing away from the turn of groove 1313 abuts against a turn of the outer side of the drain outlet 201.

A use method includes: enabling a liquid in the battery box 2 to come into contact with the expansion member 12 of the drain valve 1; expanding by the expansion member 12 to extrude sealing members 11 on two sides of the expansion member 12; and bending edges of the extruded sealing members 11 in a direction leaving the battery box 2 to form gaps between the edges of the extruded sealing members 11 and the battery box 2, where water is drained through the gaps.

In this case, for the drain valve 1, after the water/coolant is accumulated in the battery box 2 of the battery 10, the expansion member 12 in the drain valve 1 expands to allow the sealing member 11 to radially open the drain outlet 201, thereby allowing the water/coolant to be drained. In addition, when the water/coolant in the battery box 2 is completely drained, the expansion member 12 shrinks due to water loss, such that the sealing member 11 closes the drain outlet 201 again under the action of its resilience force, thereby achieving an effect of resetting. When thermal runaway occurs in the battery 10, the drain valve 1 can also serve as an anti-explosion valve for degassing, with the advantages of reliable normal sealing and repeated use.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling in the scope of the claims.

What is claimed is:

1. A drain valve, comprising:

a sealing member, wherein the sealing member is configured to be disposed on an outer side of a drain outlet of a battery box; and an expansion member, wherein the expansion member is disposed on a side of the sealing member facing the drain outlet, and the expansion member is configured to expand after absorbing water to extrude an edge of the sealing member, causing the edge of the sealing member to bend and deform, to move in a direction leaving an inner side of the drain outlet.

2. A battery, comprising:

a battery box, wherein the battery box is provided with a drain outlet communicating with an inner side and outer side of the battery box; and the drain valve according to claim 1, wherein the drain valve is connected to the drain outlet to close the drain outlet.

3. An electric apparatus, comprising:

the battery according to claim 2.

4. The drain valve according to claim 1, further comprising:

a fixing assembly, wherein the fixing assembly is configured to fix the drain valve to the battery box.

5. The drain valve according to claim 4, wherein:

the fixing assembly comprises a connecting member, a fastening member, and a bearing member, wherein a first side of the connecting member is attached to the outer side of the drain outlet, the fastening member is connected to both the connecting member and the inner side of the drain outlet, the bearing member is connected to a second side of the connecting member facing away from the first side, and the bearing member and the second side of the connecting member define a closed space; and the connecting member, the fastening member, and the bearing member are respectively provided with a first through hole, a second through hole, and a third through hole that communicate with each other, the sealing member is disposed in the closed space, and the expansion member is opposite the first through hole.

6. The drain valve according to claim 5, wherein:

an accommodating portion is recessed on a surface of the bearing member facing the second side of the connecting member, a connecting pillar extends from an inner wall of the bearing member in a direction facing the connecting member, the connecting pillar runs through the sealing member and is connected to the connecting member, and the surface of the second side of the connecting member abuts against an edge of the accommodating portion.

7. The drain valve according to claim 5, wherein:

a penetrating pillar protrudes from the first side of the connecting member, the penetrating pillar runs through the drain outlet and is partially located on the inner side of the drain outlet, and the penetrating pillar is provided with an external thread; and the fastening member is provided with an internal thread fitting with the external thread, and a turn of edge of the fastening member close to a side of the bearing member abuts against a turn of the inner side of the drain outlet.

8. The drain valve according to claim 5, further comprising:

a sealing ring, wherein the sealing ring is an elastic member, the sealing ring is disposed in a turn of groove in the first side of the connecting member, and a surface of the sealing ring facing away from the turn of groove abuts against a turn of the outer side of the drain outlet.

9. The drain valve according to claim 1, wherein:

the sealing member is provided with a concave portion on the side facing the drain outlet, the concave portion is configured for accommodating the expansion member, and the expansion member expands to extrude the concave portion to move in the direction leaving the inner side of the drain outlet.

10. The drain valve according to claim 9, wherein:

the expansion member is adhered and coupled in the concave portion of the sealing member; and/or the expansion member and the sealing member are integrally formed.

11. The drain valve according to claim 9, wherein:
the sealing member is plate-shaped, a plurality of convex strips are formed on a side surface of the sealing member, and adjacent two of the plurality of convex strips cooperate to define the concave portion.

12. The drain valve according to claim 11, wherein:
the plurality of convex strips are ring-shaped, the plurality of convex strips are concentrically spaced apart, and a center of the ring overlaps an orthographic projection of a center of the drain outlet.

13. The drain valve according to claim 11, wherein:
extension directions of the plurality of convex strips are consistent, and a first part of the plurality of convex strips are correspondingly located on one side of a center of the drain outlet, and a second part of the plurality of convex strips are correspondingly located on an other side of the center of the drain outlet.

14. The drain valve according to claim 13, wherein:
a distance between adjacent two of the plurality of convex strips in a first part of the plurality of convex strips is equal to a distance between adjacent two of the plurality of convex strips in a second part of the plurality of convex strips; and/or
the first part of the plurality of convex strips and the second part of the plurality of convex strips are symmetrical, and a distance between the first part of the plurality of convex strips and the second part of the plurality of convex strips is greater than the distance between adjacent two of the plurality of convex strips in the first part of the plurality of convex strips.

15. An automatic drainage method applied to a drain valve,
wherein the drain valve is mounted on an outer side of a drain outlet of a battery box to close the drain outlet, and the drain valve comprises:
a sealing member, wherein the sealing member is disposed on the outer side of the drain outlet; and
an expansion member, wherein the expansion member is disposed on a side of the sealing member facing the drain outlet, and the expansion member is configured to expand after absorbing water to extrude an edge of the sealing member to move in a direction leaving an inner side of the drain outlet;
the automatic drainage method comprising:
enabling a liquid in the battery box to come into contact with the expansion member of the drain valve;
expanding by the expansion member to extrude sealing members on two sides of the expansion member; and
bending edges of the extruded sealing members in a direction leaving the battery box to form gaps between the edges of the extruded sealing members and the battery box, wherein water is drained through the gaps.

16. A drain valve, comprising:
a sealing member configured to be disposed on an outer side of a drain outlet of a battery box; and
an expansion member disposed on a side of the sealing member facing the drain outlet, wherein the expansion member is configured to expand after absorbing water to extrude an edge of the sealing member to move in a direction leaving an inner side of the drain outlet;
wherein:
the sealing member is provided with a concave portion on the side facing the drain outlet, the concave portion is configured for accommodating the expansion member, and the expansion member expands to extrude the concave portion to move in the direction leaving the inner side of the drain outlet; and
the sealing member is plate-shaped, a plurality of convex strips are formed on a side surface of the sealing member, and adjacent two of the plurality of convex strips cooperate to define the concave portion.

* * * * *